US012711725B2

(12) United States Patent
Schickler et al.

(10) Patent No.: US 12,711,725 B2
(45) Date of Patent: Aug. 18, 2026

(54) PLATE MOTION CORRECTION IN SATELLITE BUNDLE BLOCK ADJUSTMENT

(71) Applicant: VANTOR INC., Westminster, CO (US)

(72) Inventors: Wolfgang Schickler, Westminster, CO (US); Nathan Swanson, Westminster, CO (US); Laurence Bleiler, Westminster, CO (US); Steven Hartung, Westminster, CO (US); Milan Karspeck, Westminster, CO (US)

(73) Assignee: VANTOR INC., Westminster, CO (US)

( * ) Notice: Subject to any disclaimer, the term of this patent is extended or adjusted under 35 U.S.C. 154(b) by 167 days.

(21) Appl. No.: 18/737,590

(22) Filed: Jun. 7, 2024

(65) Prior Publication Data

US 2025/0378673 A1 Dec. 11, 2025

(51) Int. Cl.

| | |
|---|---|
| ***G06V 10/24*** | (2022.01) |
| ***G06T 7/246*** | (2017.01) |
| ***G06V 10/10*** | (2022.01) |
| ***G06V 10/766*** | (2022.01) |
| ***G06V 20/13*** | (2022.01) |

(52) U.S. Cl.

CPC ............ *G06V 10/245* (2022.01); *G06T 7/246* (2017.01); *G06V 10/16* (2022.01); *G06V 10/766* (2022.01); *G06V 20/13* (2022.01); *G06T 2207/10032* (2013.01)

(58) Field of Classification Search

CPC .... G06V 10/245; G06V 10/16; G06V 10/766; G06V 20/13; G06T 7/246; G06T 2207/10032

See application file for complete search history.

(56) References Cited

U.S. PATENT DOCUMENTS

| | | | | |
|---|---|---|---|---|
| 6,097,854 A * | 8/2000 | Szeliski | G06V 10/147 | 382/284 |
| 2010/0020933 A1* | 1/2010 | Topfer | H04N 5/21 | 382/130 |
| 2011/0064312 A1* | 3/2011 | Janky | G06T 7/74 | 382/195 |
| 2011/0193764 A1* | 8/2011 | Shen | H01Q 1/125 | 343/882 |
| 2015/0042648 A1* | 2/2015 | Jung | G06T 17/05 | 345/420 |
| 2015/0371431 A1* | 12/2015 | Korb | G06V 10/60 | 382/113 |
| 2019/0304199 A1* | 10/2019 | Daniels | G01S 19/01 | |

* cited by examiner

*Primary Examiner* — Santiago Garcia
(74) *Attorney, Agent, or Firm* — Harness, Dickey & Pierce, P.L.C.

(57) ABSTRACT

Plate tectonic movements can cause drift in the position of common points used in generating maps, such as ground control points and tie points. Over time, if not corrected for, plate tectonic movement results in older images no longer accurately reflecting the ground position of the imaged features. Furthermore, plate tectonic movements are not uniform across the world and can vary significantly in direction and velocity from region to region across the globe, or between images, or even within a single image. Several methods for accounting for these movements are described herein that can use images at different times to more accurately indicate current ground coordinates by applying plate tectonic movement information.

20 Claims, 9 Drawing Sheets

PLATE MOTION CORRECTION IN SATELLITE BUNDLE BLOCK ADJUSTMENT

TECHNICAL FIELD

Example embodiments described herein relate generally to the field of satellite imaging. More particularly, the disclosure relates to generation or corrections to maps based on movement of the underlying tectonic plate.

BACKGROUND

To be useful in most contexts, an image obtained by a satellite must be mapped from image space to ground coordinates. If a satellite image shows features that are offset from the position where they are expected to be, there are several possible reasons. First, the pointing direction or angle of the satellite could be different from what is expected, as described in copending application entitled "Improvement Of Satellite Image Accuracy With Mobile Mapping Trajectories," having U.S. patent application Ser. No. 18/745,548, the contents of which are incorporated herein by reference in their entirety for all that they teach. Second, the features that are detected in the image themselves could have moved, such that the ground coordinates of the object that is imaged is no longer in the same position where it was previously relative to some coordinate system (e.g., latitude, longitude, and altitude) or to nearby objects.

When a feature has moved, it could be that the feature has moved relative to the ground, such as if a roadway is repaved in a slightly different position from its original location, or when a waterway level rises or falls compared to a previous image. However, it is also possible that the ground itself has moved. That is, tectonic plate movement that undergirds the features captured in a satellite image can result in displacement of those features.

Satellite images can be used in mapping and geolocation. Increasingly, users of such mapping systems expect high resolution and precision of the locations of the features identified within satellite images. In view of changes in the position of those features, it can be difficult to ascertain which changes in perceived position are due to pointing direction error, movement of the features themselves, and movement of the underlying tectonic plate.

To increase precision and reduce these uncertainties, bundle block adjustments are used in some models to account for tectonic plate movement. Bundle block adjustments involve the adjustment of multiple overlapping satellite images to create a seamless mosaic or accurate representation of a larger area. Bundle block adjustments are a technique used to correct satellite images in the presence of tectonic plate movement. When plate tectonics cause shifts in the Earth's crust, satellite images may exhibit misalignments or distortions. Bundle block adjustments involve the use of ground control points (GCPs) with known coordinates to accurately align and rectify the images. By measuring the displacements of GCPs caused by plate movement, adjustments are made to image measurements, compensating for the distortions and aligning them with a consistent coordinate system. This allows for the creation of accurate and georeferenced satellite imagery, facilitating precise analysis, mapping, and monitoring of the Earth's surface over time.

To correct for plate tectonic movements using bundle block adjustments, a combination of methods may be employed. One approach could involve the use of ground control points (GCPs) or control networks, which are accurately surveyed points on the Earth's surface with known coordinates. These GCPs can serve as reference points for aligning and adjusting the satellite images. By measuring the shifts and displacements of GCPs over time, it is possible to estimate and correct for plate tectonic movements.

A technique for creating a ground control network is disclosed in Dolloff, J., and M. Iiyama (2007), "Fusion of Image Block Adjustments for the Generation of a Ground Control Network," Proceedings from the Information Fusion, 2007 10th International Conference, Jul. 9-12, 2007 and U.S. Pat. No. 8,260,085 (collectively, "Dolloff"), the entire contents of each of which are incorporated herein by reference. This technique includes creating a ground control network of multiple ground control points (GCPs) from overlapping images generated from aerial and space-borne sensors and measurements of ground points in those images. Bundle block adjustments are described, for example, in U.S. Pat. No. 9,251,419, the contents of which are incorporated by reference in their entirety and for everything that they teach.

Bundle block adjustments can be used to provide a rough adjustment that removes most of the uncertainty related to what effect tectonic plate movement has on the location of features within one or more satellite images. Bundle Block Adjustment can be performed according to those described in U.S. Pat. Nos. 11,532,070 and 11,676,256, the contents of which are incorporated herein by reference in their entirety.

SUMMARY

The example embodiments described herein meet the above-identified needs by providing methods, systems and computer program products for A method is described herein for adjusting image satellite images to account for plate motion. The method includes receiving a satellite image that includes a common point, the satellite image covering the region at a collection time point. The method then includes determining a motion of the common point between the collection time and an adjustment date to define a plate motion correction. A ray can then be defined from the satellite to the common point. The ray can be adjusted by multiplying the plate motion correction by the difference of the adjustment date and the collection time. A bundle block adjustment can be performed on the adjusted rays to generate an adjusted image that is accurate for the adjustment date.

Determining the motion of the common point between the collection time and the adjustment date to define the plate motion correction can involve using a plate motion model. The method can include receiving many satellite images, each of the satellite images comprising the common point at a corresponding time, and wherein the method comprises multiplying the plate motion correction by the difference between the adjustment date and each of the corresponding times to adjust a ray corresponding to the common point in each of the satellite images. The satellite images can overlap with one another. The method can include statistically fitting the adjusted rays from each of the corresponding times using a statistical model. The statistical model can include a regression model, such as a least-squares algorithm.

The satellite image can include a many common points including at least one ground control point and at least one tie point. The method can include adjusting a ray corresponding to the at least one ground control point and a ray corresponding to the at least one tie point based on the difference between the adjustment date and the collection time. Applying the bundle block adjustment can include multiplying both the tie point motion vector and the ground control point motion vector by the amount of time in image space to generate the adjusted image. Deformation zones can be defined within the satellite images and those deformation zones can be excluded from the bundle block adjustment. Tie points are features recognizable in multiple satellite images, and ground control points are features recognizable in multiple satellite images and having known ground coordinates. The plate motion correction can be applied to all points on the satellite image. The plate motion correction can be applied as an adjustment to the attitude and ephemeris input to the satellite image.

According to another embodiment, a method for adjusting image satellite images to account for plate motion using a stochastic variable is disclosed. According to the method, a satellite image is received corresponding to a region at a collection time, the satellite image comprising a common point. The method includes determining a motion of the common point between the collection time and an adjustment date to define a plate motion correction, defining a ray from the satellite to the common point, adjusting the ray by multiplying the plate motion correction by the difference of the adjustment date and the collection time according to the stochastic variable corresponding to the common point, and applying a bundle block adjustment to generate an adjusted image for a desired time amount of time.

Optionally, the method can be applied to a plurality of received satellite images each corresponding to the region, each of the plurality of received satellite images taken at a corresponding time. The method can include statistically fitting the adjusted rays from each of the received satellite images at the corresponding times using a statistical model. The statistical model can be a regression model, such as a least-squares model. The plate motion correction can be applied as an adjustment to the attitude and ephemeris input to the satellite image. The satellite image can include a multiple common points, including at least one ground control point and at least one tie point. The tie points are features recognizable in multiple satellite images, and wherein ground control points are features recognizable in multiple satellite images and having known ground coordinates.

BRIEF DESCRIPTION OF THE DRAWINGS

The features and advantages of the example embodiments of the invention presented herein will become more apparent from the detailed description set forth below when taken in conjunction with the following drawings.

FIG. 1A is a simplified schematic of a satellite imaging system, while

DETAILED DESCRIPTION

Figure 1A:
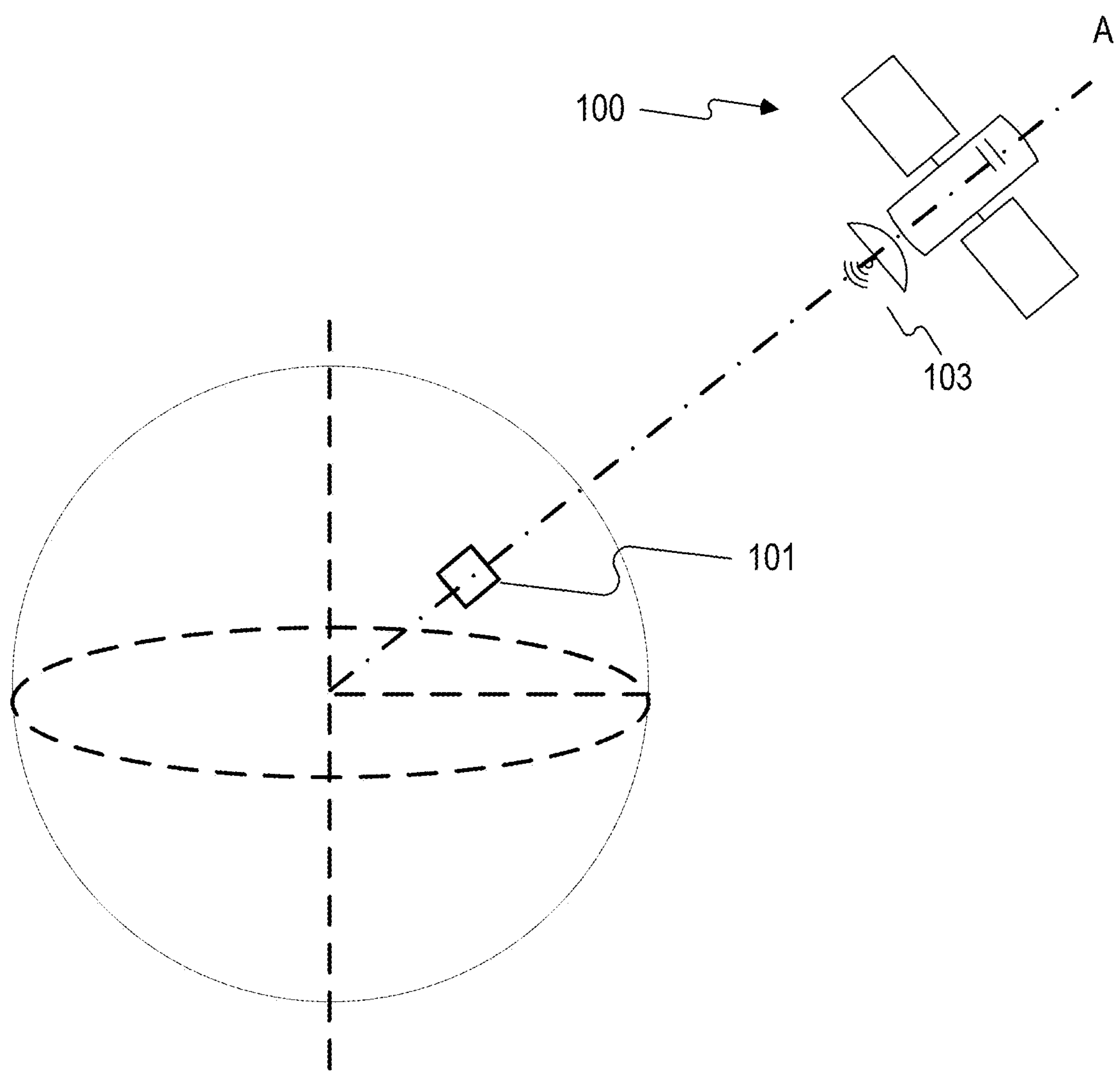

The example embodiments of the invention presented herein are directed to methods, systems and computer program products for automated vectorization techniques for extracting vectors from imagery, which are now described herein in terms of an example aerial or satellite imagery of features such as buildings and roads. This description is not intended to limit the application of the example embodiments presented herein. In fact, after reading the following description, it will be apparent to one skilled in the relevant art(s) how to implement the following example embodiments in alternative embodiments (e.g., involving any form of imagery and/or imagery of features other than buildings and roads).

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

Illustrative examples of the disclosure are described below. In the interest of clarity, not all features of an actual implementation are described in this specification. It will of course be appreciated that in the development of any such actual example, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The example embodiments of the invention presented herein are directed to methods, systems and computer program products for correlating satellite images to ground coordinates.

To generate a map of a large area, satellite images are combined through a process known as image mosaicking. Satellite images that cover parts of the desired area are arranged with overlap between them. These images are then georeferenced by assigning geographic coordinates to specific points within each image using Ground Control Points (GCPs) or matching features to a reference map or digital elevation model.

Once the images are georeferenced, they can be aligned. This alignment ensures that the images are spatially registered and accurately represent the area. Common features or GCPs in adjacent or overlapping images are matched, and geometric transformations are applied to align them correctly.

To create a seamless transition between overlapping areas, the aligned images can optionally be blended together. Techniques like feathering or gradient blending can be used to minimize visible seams and provide a smooth merge. In some types of images, color and contrast adjustments may also be applied to ensure visual consistency across the mosaic.

After aligning and optionally blending the images, they are composited or stitched together to form a single large mosaic representing the map of the entire area of interest. This final image mosaic combines the information from multiple satellite images to provide a comprehensive view of the area. Additional processing steps, such as noise reduction, image enhancement, or feature extraction, can also optionally be applied to further refine the map based on specific requirements or applications.

The resulting image mosaic represents a map of the large area, synthesized from multiple satellite images. This map can be utilized for various purposes, including land management, environmental monitoring, urban planning, or any other application that requires a comprehensive understanding of the area's geographic information.

Every point on earth is subject to plate motion. The magnitude and direction of the motion varies by location and can be up to 70 cm per decade. As users of satellite image feature location request ever more precise data, including sub-meter accuracy, plate motion becomes a factor that must be considered during the process that defines the accurate geolocation of satellite image data, which is the Bundle Block Adjustment (BBA).

As described in the Background, BBAs are an established mechanism for tying images together and also for tying them to true ground coordinates through GCPs to increase the accuracy of the satellite imaging system. However, in some instances a tectonic plate movement is not uniform across a block or an image. Rather, some portions may be compressing while others may be stretching, for example.

Conventionally, Ground Control Points (GCPs) have been adjusted for plate motion before using them in a BBA. This of course can only account for an average plate motion within a block to a particular epoch. Adjusting only GCPs does not account for the fact that the images within a block can be from various acquisition dates and therefore requiring individual corrections for each image. Only a rigorous method that applies correction in image space can handle this. Such rigorous methods are described herein.

Tectonic plate motion can be non-uniform due to various factors, including differences in plate size, irregularities in plate boundaries, and variations in the forces acting on the plates. As plates interact at their boundaries, they can experience different rates and directions of movement. This non-uniform motion can lead to stretching or extension of the Earth's surface along divergent plate boundaries, where plates move away from each other, causing the crust to thin and create features like rift valleys. Conversely, compression occurs at convergent plate boundaries, where plates collide, resulting in folding, faulting, and the formation of mountain ranges due to the compression and shortening of the crust.

As a result of these non-uniformities, it may not be appropriate to apply a BBA with plate motion correction across the entirety of a single image or region. A single satellite image could include, for example, a fault line between two plates that are moving in different directions, or it could include a region that is stretching or shrinking along a particular direction or multiple directions.

Illustrative examples of the disclosure are described below. In the interest of clarity, not all features of an actual implementation are described in this specification. It will of course be appreciated that in the development of any such actual example, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The following section defines some of the terminology used throughout this disclosure. The definitions provided below are intended to be consistent with common usage in the field of satellite imaging, and are for clarification only. However, to the extent that these definitions conflict with common usage, the definitions below are intended to control.

"Image" or "satellite image" is used throughout this disclosure to refer to an image acquired from an aerial or satellite-mounted camera. Although "satellite image" may be used as a shorthand to describe such images, there is no practical difference between an image acquired from a balloon, a non-orbiting spacecraft, a satellite, an airplane, or any other non-terrestrial camera. Increasingly, aerial images are obtained from small unmanned aerial vehicles. Imagery obtained by any and all of these types of cameras are intended to be within the scope of "image" or "satellite image" as used throughout this disclosure.

The image places features at "image coordinates." The image coordinates for features captured in an image can be based upon an algorithm or model that corrects for the position and orientation of the camera.

"Ground coordinates," in contrast, are generated based upon the mobile mapping. Ground coordinates, like image coordinates, can have a three-dimensional position. In an ideal, perfectly calibrated system, the image coordinates can be used to compute corresponding ground coordinates. However, due to various imaging errors or unmodeled tectonic plate motion, computed ground coordinates may be offset from their true location. However, due to various imaging errors or changes in tectonic plate position as described above, the image coordinates may be offset from the ground coordinates.

Figure 1B:
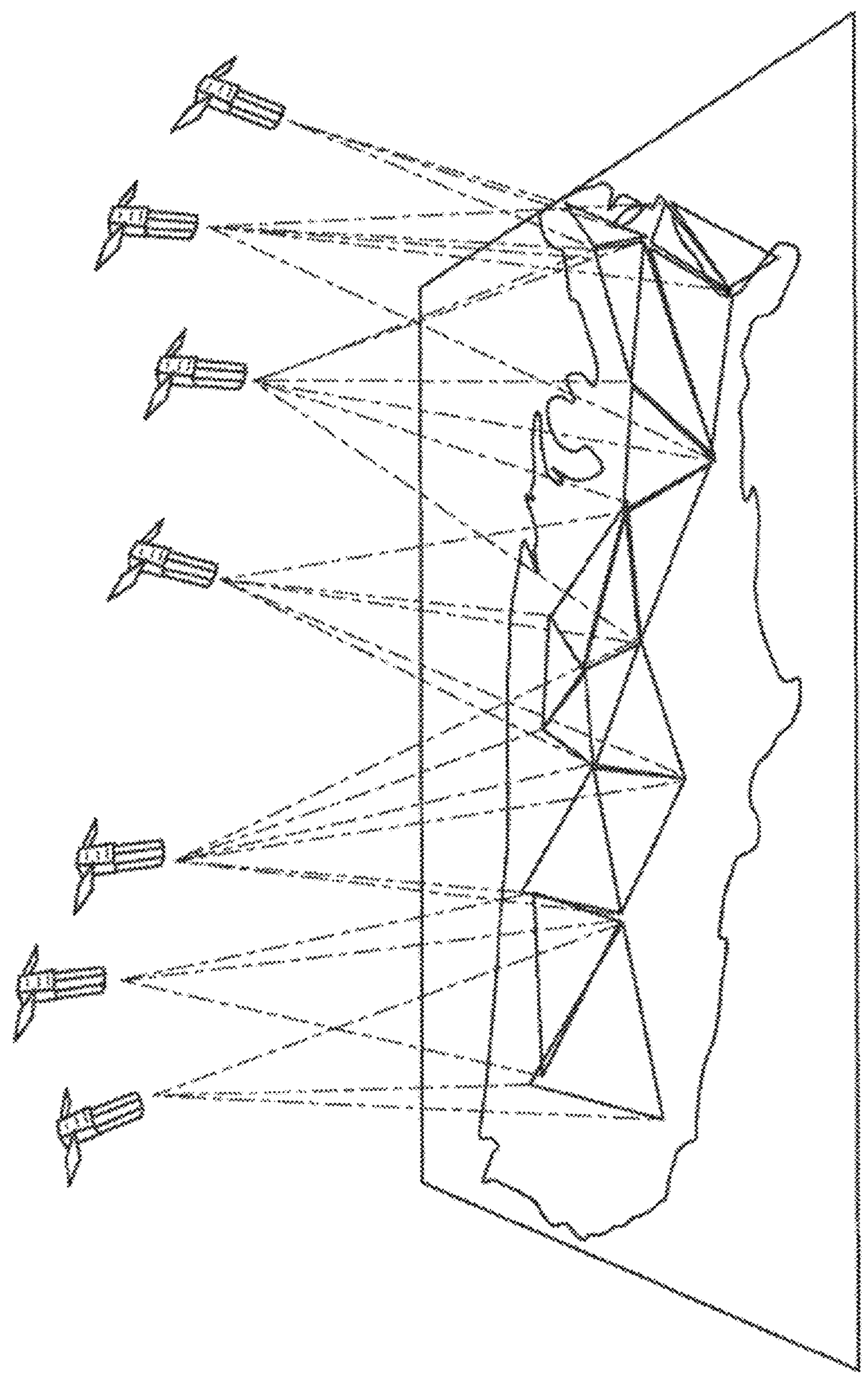
FIG. 1B shows a series of satellite images that are aligned or overlapping with one another and can be stitched or mosaiced together to form a map.

FIGS. 1A and 1B are a representation of a system for satellite imaging. As shown in FIG. 1A, a satellite 100 is pointed along an axis A towards a target 101 to generate an image 102 thereof by a camera 103.

Satellite 100 can be any of a variety of remote platforms, such as a space station or communications or imaging satellite as shown, or even a platform that is not fully in space such as a balloon, or an airplane, drone, glider, or the like. Depending upon the elevation and speed relative to the ground (e.g., whether the satellite 100 is in low earth orbit, geosynchronous orbit, in the atmosphere, etc.).

Target 101 is a location that the satellite 100 is imaging. In FIG. 1A, target 101 is a location on a sphere, representing a satellite image of Earth. However, the methods and systems disclosed herein may be usable in other contexts. For example, other planets, moons, or manmade structures currently in existence or that may be constructed in the future may have features thereon that are usable according to methods described herein.

An image of the target 101 can include a variety of features as shown in FIG. 1B, including natural features like rivers, streams, trees, and mountains that are present at target 101. Additionally, an image of the target 101 includes any manmade features such as roads, rails, and buildings at the target 101.

Camera 103 can be any of a variety of commercial cameras that can be mounted to a satellite 100. Camera 103 is carefully aligned along axis A and pointed towards a desired target 101 so that an image of the target 101 does not depict an area that is offset from the desired target 101. Camera 103 can be a color camera, or a black-and-white camera that measures brightness of visible light as a whole. Generally the output of camera 103 will be an image file or a set of image files that can be stitched together to form a larger image or mapping of an area of interest.

FIG. 1B is a simplified illustration of an imaging satellite taken from U.S. Pat. No. 9,875,404, the contents of which are incorporated herein by reference in their entirety. As shown in FIG. 1B, images are taken at various different times in various different positions above a land mass (in this case North America, where only the continental United States is illustrated). In each position, the satellite is able to obtain ground images. The WorldView satellite instruments are pushbroom electro optical (EO) sensors that have high pointing accuracies of 3-4 meters on the ground. Panchromatic band ground sample distances (available in commercial imagery) are as small as 0.15-0.3 m for the WorldView sensors.

In this overly-simplified example, each vertex represents a Ground Control Point (GCP) in the MIN, and each edge represents the cross-covariance between errors in the two GCPs that it connects. Each GCP will have been observed in two or more images (which are not shown in this diagram), and nearby Ground Control Points are likely to have been observed at least once in the same image. This common origin produces the correlation in coordinate errors that is represented by the cross-covariance matrix. Errors in GCPs that are farther apart are still correlated, but more weakly. The network of GCPs, tied together by their error covariance matrices, is known as a Metric Information Network (MIN).

Initially, at least two images are obtained of an area on the ground, although any larger number of images could be used. They may be a pair of stereo images, but that is not a requirement. In the case of the pair, they may be taken from different points in space (e.g., with a 40-60 degree collection angle between them). For example, an image can be taken of a ground location as the satellite approaches the location and then again after the satellite passes the location. It should be noted that it is known to reasonable accuracy the locations on the ground where the image was taken and the location above the ground where the satellite was when the image was taken, via information from the satellite's GPS receiver and IMU. These locations can be expressed in earth centered, earth-fixed (ECF) coordinates of x, y, and Z, where the point (0,0,0) is located at the center of mass of the Earth, the x-axis runs through the Greenwich Meridian at the Equator, the y-axis is orthogonal thereto and also runs through the Equator, and the Z-axis runs through the North Pole, as depicted generally in FIG. 1A.

Figure 2:
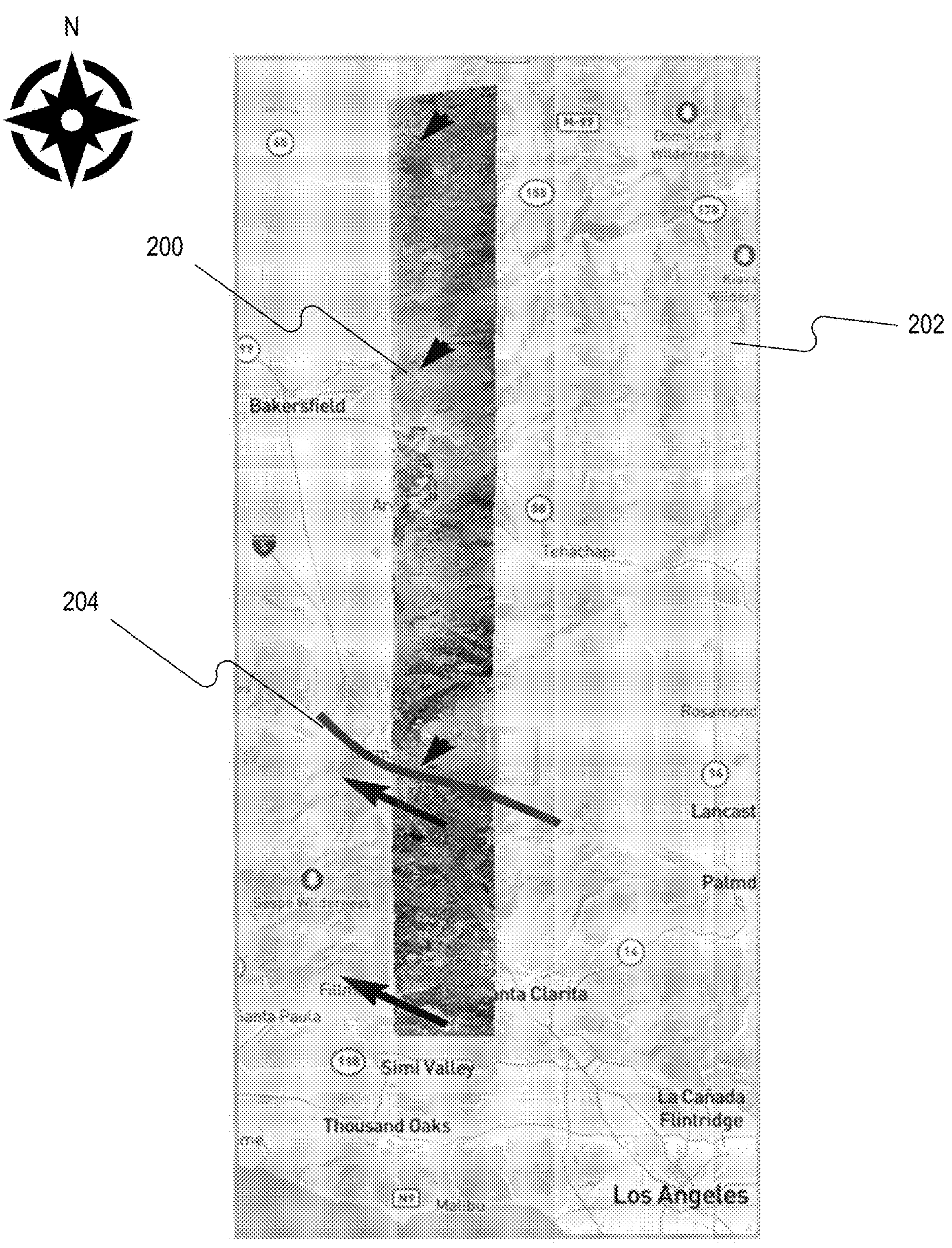
FIG. 2 is an image that includes a discontinuity in plate motion velocity.

FIG. 2 shows one example of a satellite image 200 overlaid on a map 202. In the example depicted in FIG. 2, the satellite image 200 is a photograph taken of an area that includes a fault line 204 (in this case, the San Andreas fault in California).

FIG. 2 also shows the actual motion of the terrain due to plate tectonics, using representative arrows. As is apparent from FIG. 2, the portion of the terrain that is captured in satellite image 200 and north of the fault line 204 is moving relatively slowly and in a southwesterly direction, while the arrows in the portion to the south of the fault line 204 are moving relatively quickly in a west-northwesterly direction.

The fault line shown in FIG. 2 is only one example type of geologic feature that can cause different portions of a captured image to move at different rates from other parts of a captured image. While fault lines are an extreme example, other types of movement can cause parts of the Earth's crust to move at different speeds relative to one another, either discontinuously as at a fault line or continuously such as when an area is uniformly compressed.

Different parts of the Earth's crust can move at different speeds relative to one another due to several factors associated with plate tectonics. Firstly, variations in the driving forces behind plate motion play a significant role. Plates are primarily driven by the convective flow of the underlying mantle, but the forces can vary in magnitude and direction, leading to differential movement. The presence of different types of plate boundaries influences their relative motions. For instance, at divergent boundaries, where plates move apart, the spreading rate can differ along various segments, resulting in variable speeds. At convergent boundaries, where plates collide, differences in slab subduction angles or resistance along the boundary can cause variations in plate speeds. Furthermore, the presence of hotspots, such as volcanic activity associated with mantle plumes, can create localized variations in plate motion. These hotspots can cause plates to move at different speeds as they interact with the upwelling material. The presence of obstacles or irregularities along plate boundaries, such as transform faults or complex geometries, can impede or facilitate plate motion, leading to differences in speed. Moreover, the rheological properties of the lithosphere and underlying asthenosphere influence plate motion. Variations in temperature, composition, and strength of the lithospheric material can cause differential movement between plates. Finally, the history of plate interactions and the accumulation of stress over time can result in variations in plate speeds. Previous events like subduction or collision can leave a lasting impact on the relative motions of adjacent plates.

Existing BBA techniques use GCPs by calculating a ray from the satellite to each GCP and correcting attitude and ephemeris settings of the sensors. In that context, plate motion can be incorporated into the model in several ways described below, each resulting in a more precise solution than those existing solutions.

Figure 3:
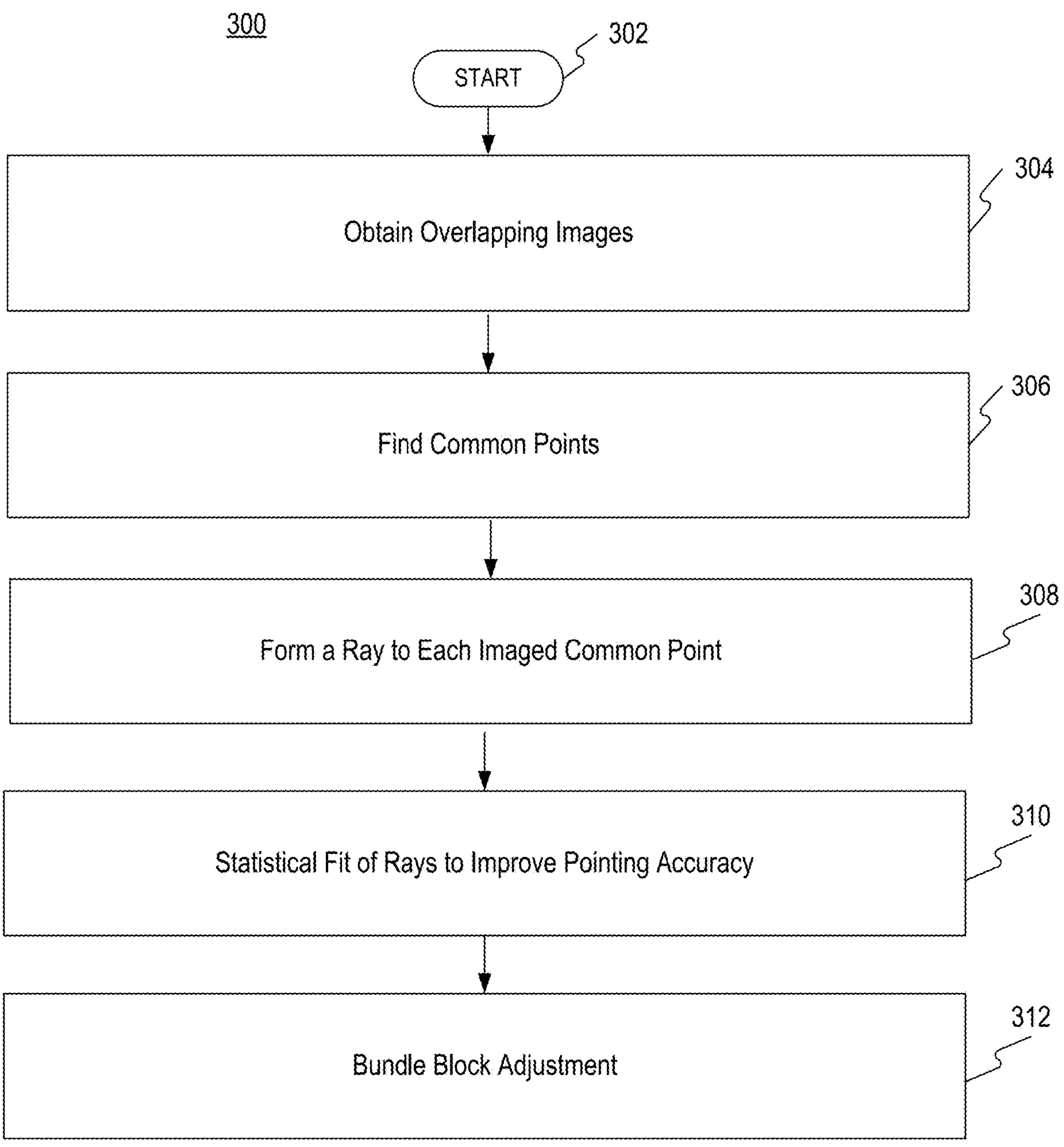
FIG. 3 is a flowchart of a method for performing a bundle block adjustment to increase precision and account for change in ground coordinates of features captured in an image as a function of time.

A general flow for bundle block adjustment is shown in FIG. 3, and novel aspects of this flow are described below with respect to Aspects 1, 2, and 3.

As shown in FIG. 3, a BBA method 300 starts (302) with obtaining overlapping images at 304. Obtaining overlapping images (304) is shown, for example, in the simplified figure FIG. 1B, but in practice can include many different images from different positions and, critically for the following discussion at different times. Those times are referred to herein with the shorthand notation $t_1$, $t_2$, $t_3$, etc.

Once these overlapping images have been obtained, common points are identified (306). Common points are well-understood in the field and can include GCPs, tie points, or other features on the images that are usable to combine the different images from 304.

A satellite captures images in image space: that is, a 2-dimensional array of pixels that are captured of a 3-dimensional object. At 308, a ray is formed the points from the satellite's location to ground coordinates of each of the common points. A satellite image will always inherently have some error in captured location of a common point, based on both the image resolution and the precision of knowledge of the attitude, ephemeris, roll, pitch, yaw, or other positional or orientational attributes of the satellite itself.

At 310, the rays that point to each common point are compared and a statistical fit is used to improve pointing accuracy. That is, if each individual image has some inherent uncertainty as described above, the combination of multiple images can be used to reduce that uncertainty and form a ray that has a much higher level of precision and accuracy. The statistical fit can be determined using a statistical model, which can be a regression model such as a least-squares model.

At 312, the BBA is performed, which can include adjusting the orientation parameters of multiple overlapping images within a block or set.

Aspect 1: Adjustment of Attitude and Ephemeris of Individual Images Used in BBA

In a first aspect, forming the rays at 308 is performed as a function of time and incorporating the known motion of an underlying tectonic plate. Aspect 1 is a preprocessing adjustment prior to the BBA. Aspect 1 adjusts attitude and ephemeris of each image individually as a function of time, accounting for the fact that images are acquired during different times. Plate motion is a function of time, so the same GCP may have moved to a different location in one image compared where it is in another image. Therefore, only a method that adjusts images individually based on time—as described in Aspect 1—can account for that fact.

In accordance with this aspect, a plate motion model is obtained. Plate motion models are readily available and take a variety of forms, as described in Altamimi et al., ITFR2020 Plate Motion Model, Geophysical Research Letters (22 Dec. 2023) (DOI 10.1029/2023GL106373), the contents of which are incorporated herein for all that they teach.

Based on the plate motion model, the attitude and ephemeris (or other positional or orientational attributes) of the satellite at the time that the image were taken are adjusted to account for the time at which the image was taken and the known movement of the tectonic plate in that time.

Figure 4:
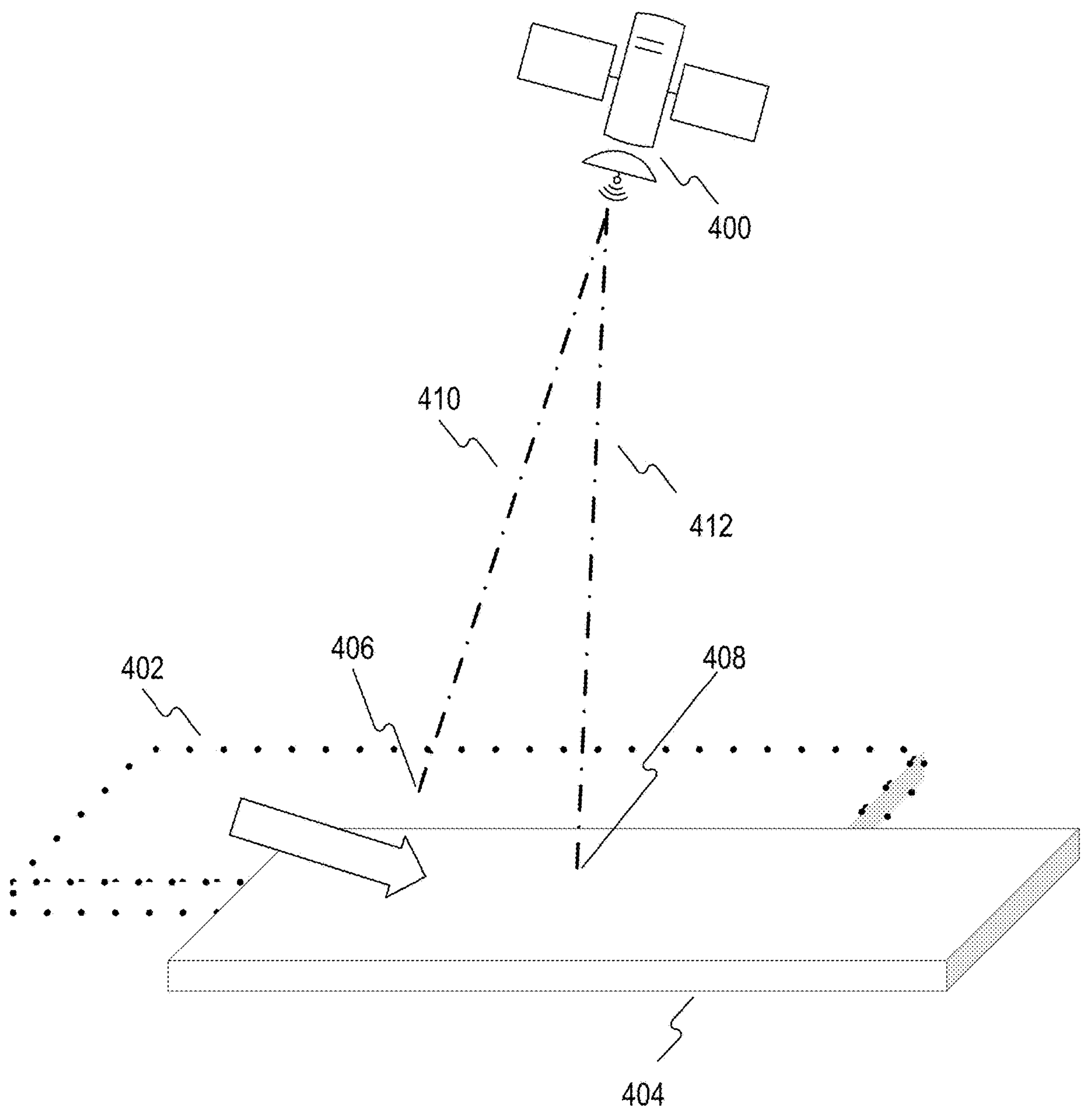
FIG. 4 graphically depicts movement of a common point due to plate tectonic motion, as described with respect to the method flow chart of FIG. 3.

As shown in FIG. 4, a satellite 400 captures an image of a target at a first position 402 (at $t_1$). After time has passed, due to the underlying movement of the tectonic plate, the target is at a second position 404 (at $t_2$). A common point, such as a GCP, is located at a point 406 at $t_1$ and at a shifted point 408 at $t_2$.

In view of this movement, the ray 410 that was originally captured at time $t_1$ can be updated, based on the known movement (depicted with the open arrow in FIG. 4), to arrive at the ray 412. This does not require obtaining a new The extent of the movement is exaggerated in FIG. 4. Typically, a slight adjustment to attitude and/or ephemeris of the satellite can compensate for even a lengthy difference of time between $t_1$ and $t_2$. For example, a typical adjustment may be on the order of a few microradians for a time difference on the scale of several weeks.

Figure 5:
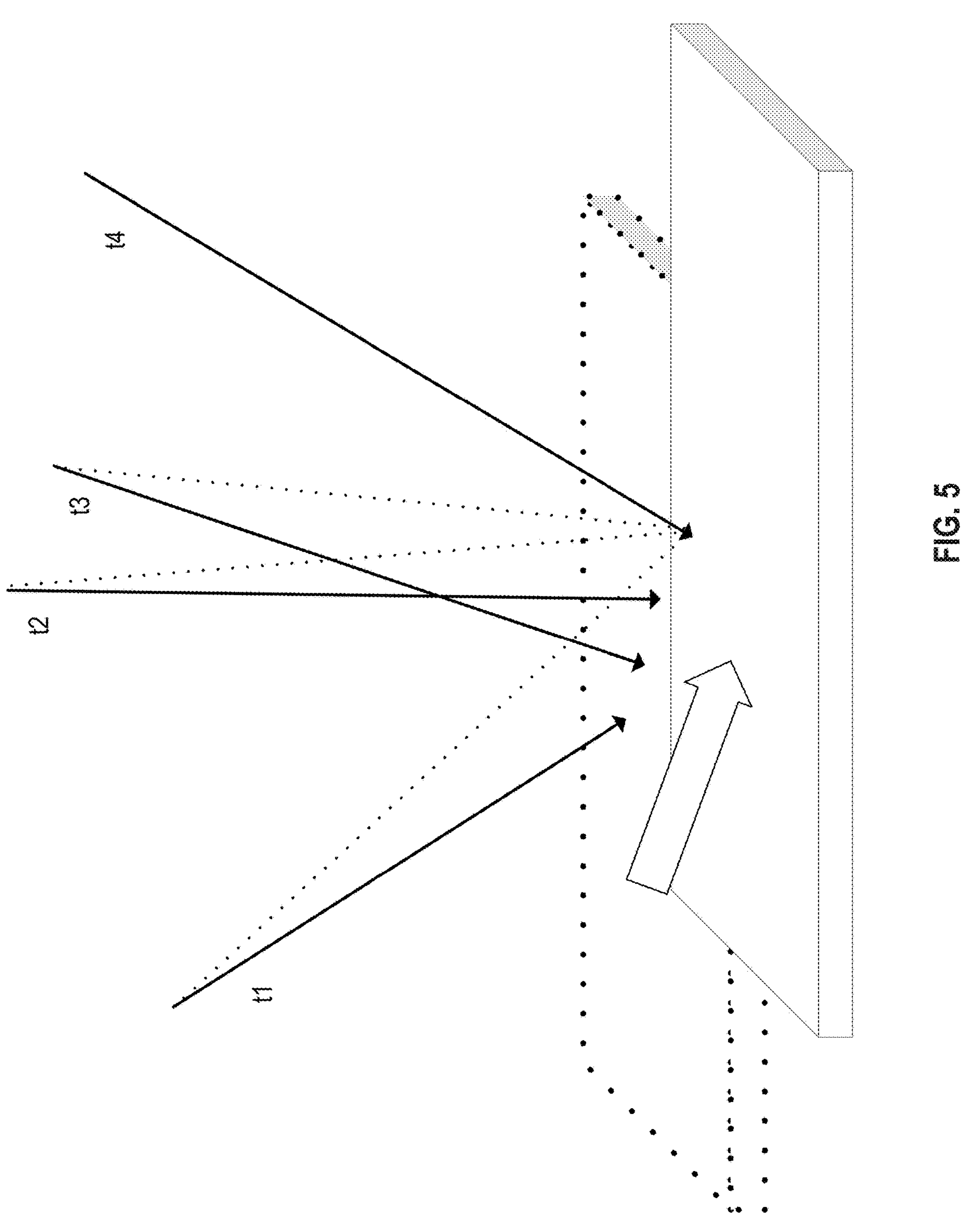
FIG. 5 graphically depicts the movement of the common point of FIG. 4 as a function of time through four specific time points.

As shown in FIG. 5, correcting the rays based on the time of acquisition addresses a problem of movement of the common point that is being imaged over time. As shown in that figure, the same common point is imaged at times $t_1$, $t_2$, $t_3$, and $t_4$. Due to the movement (indicated by the arrow) of the common point, the four rays associated with those time points are directed to four different locations, each of which was substantially accurate at the time of its acquisition.

In practice, then, statistically fitting rays at 310 can be improved by performing such a correction to the rays that are input into the statistical model. This is because even if the attitude and ephemeris of the satellite were very precisely known, and even if there were a very high image resolution, the movement of the underlying plate itself will result in different ray pointing directions over time. Furthermore, this correction can be done prior to BBA, in a pre-processing step that is easy to implement by spoofing the attitude and ephemeris of the satellite to account for the subsequent movement of the target.

As shown in FIG. 5, the dashed lines represent the original rays (which are in solid line) adjusted for subsequent movement of a tectonic plate until time $t_4$. Combining the actual ta measurement with the adjusted $t_1$, $t_2$, and $t_3$ rays will lead to a higher precision, and will also be more accurate with the actual position of the target at time $t_4$.

Of course, the adjustment described herein can be extended past the last imaging time (in the example of FIG. 5, $t_4$). For example, if some time has passed since the last image was acquired, old images can be continuously updated using the tectonic plate movement data to arrive at the current position of the target.

Aspect 2: Adjustment of Image Measurements During BBA

While the solution of Aspect 1 is easy to implement, it does not address one of the issues described above, which is motion that varies within the images acquired at 304 in FIG. 3. That is, if different parts of the ground are moving at different speeds, Aspect 1 will not provide as accurate a solution.

Figure 6:
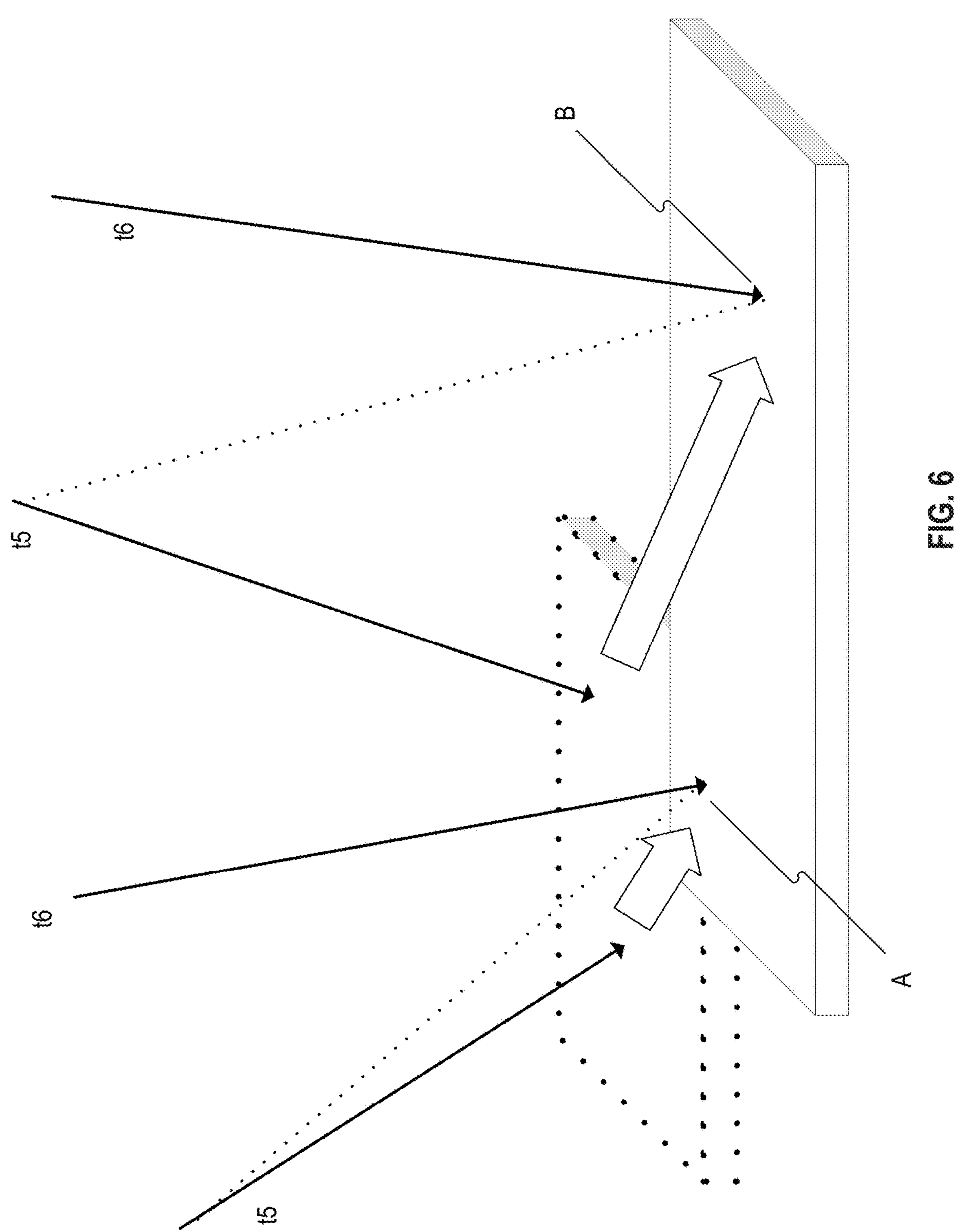
FIG. 6 graphically depicts the movement of two common points that are moving at different speeds within the same image as a function of time.

As shown in FIG. 6, two GCPs are imaged at a time $t_5$, and by time to the position of those GCPs has changed. Notably, the two targets A and B move different amounts, as indicated by the arrows. Target A moves a relatively short distance, while B moves a relatively far distance. This could be caused, for example, due to a fault line between the two targets A and B in which the tectonic plate that is being imaged is tearing apart.

Figure 7:
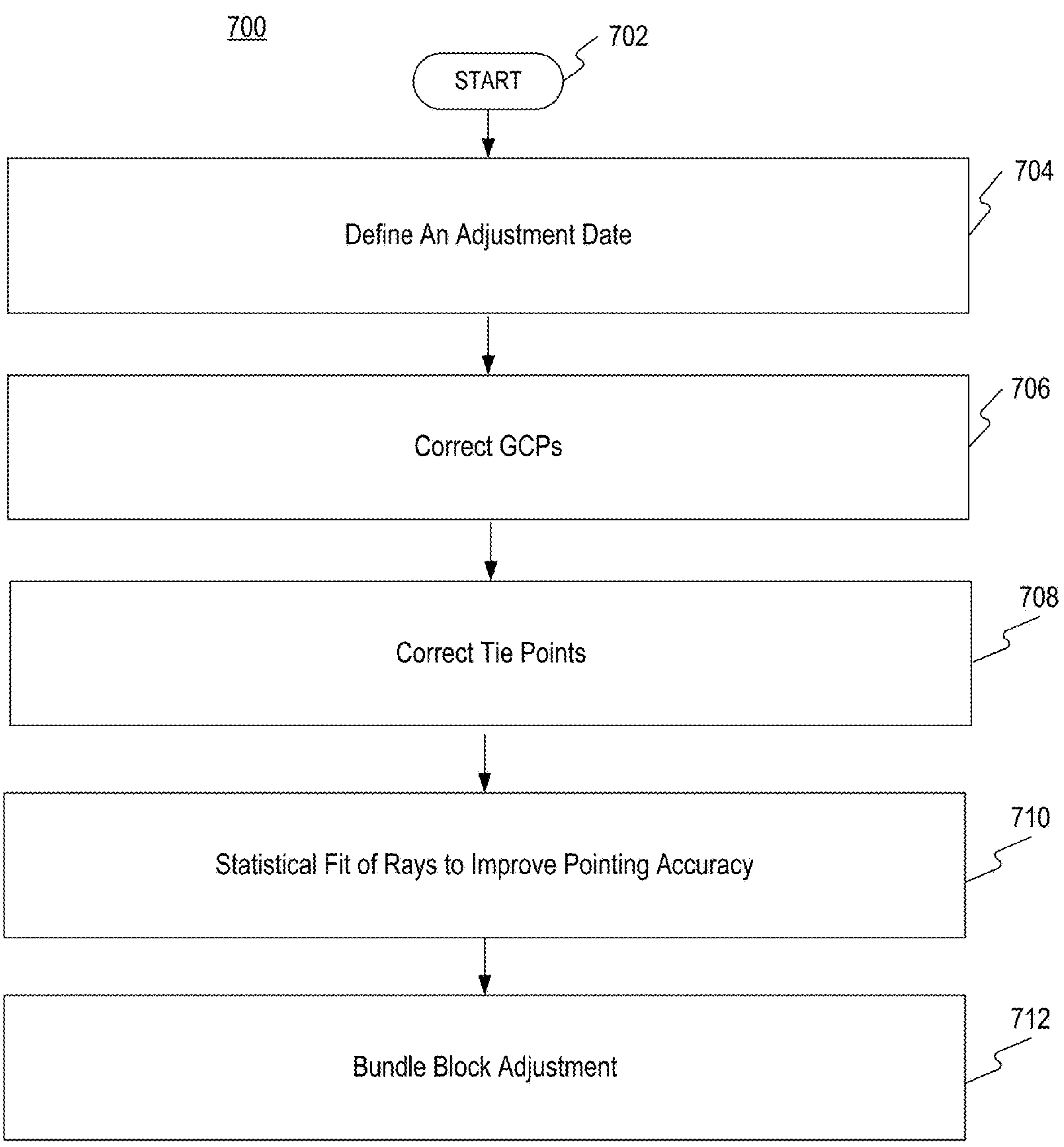
FIG. 7 is a method flow chart for incorporating plate tectonic motion into a bundle block adjustment to increase precision and account for change in ground coordinates of features that include both ground control points and tie points as a function of time.

FIG. 7 shows a method flowchart according to Aspect 2, starting at 702.

At 704, an adjustment date is selected, which is the date for which accurate ground position data is desired (e.g., time to in FIG. 6).

At 706, CGP image measurements are corrected. Each GCP can be corrected from the epoch or date of the imaging of the GCP to the adjustment date selected at 704. Again referring to the example shown in FIG. 6, this constitutes updating each GCP from $t_5$ to $t_6$. This adjusts the ephemeris and attitude information of the satellite to be as though the image were obtained at the adjustment date.

At 708, tie points can also be corrected independently from one another. Each tie point can be corrected from the image acquisition date to the adjustment date selected at 704. Tie points are not known in 3D space initially as GCPs are, but are common points between the images.

The plate motion, imaged tie points, and imaged GCPs can be fed into a computational model to adjust ground positions to a defined adjusted date by modifying the vectors from the time at acquisition date to the location at the adjustment date using plate motion models to output a ground image projection at the adjustment date. The adjustment date can be to present day, or to a past date, or into the future. Many users of satellite data rely on accurate up-to-date location information, and these adjustments make the ground location data more accurate and precise for any particular time point.

This process can therefore be even more accurate than the methods described in Aspect 1, because it treats each GCP separately and also incorporates tie point information into the model in between the GCPs.

While Aspect 2 addresses deformation within individual imaged areas over time, it cannot address deformation zones specifically. Deformation zones can be defined within a model so that no time-corrected vector is returned within those regions.

Aspect 3: Introduction of Plate Motion as Observation During BBA

According to a third aspect, plate motion can be introduced as an observation during the BBA itself. This can provide even higher levels of precision than Aspects 1 and 2, and can handle varying image motions by using the plate motion as a stochastic variable.

A stochastic variable is a variable whose value is subject to randomness or uncertainty. In other words, it is a quantity whose value is not fixed but rather determined by chance. Stochastic variables are fundamental in probability theory and statistics and are used to model various phenomena in which outcomes are not deterministic but follow some probabilistic distribution. Plate motion is such variable, and will generally not be consistent as a function of time. Rather, during seismic events such as earthquakes there can be faster and slower movements as plates stop and start sliding against one another.

In other words, rather than applying a uniform adjustment as in FIGS. 5 and 6 based on the underlying plate, the adjustments are applied as a vector for each ray in the BBA itself.

Computer Implementations

For any of the Aspects 1, 2, or 3, there are various computer-implemented ways for implementing the identification of common points at 306, forming the rays at 308, statistically fitting the rays at 310, and performing BBA at 312 of FIG. 3. Likewise, GCP correction at 706, correct the tie points 708, and perform statistical fitting and BBA (710, 712), of FIG. 7 can be performed using a computer.

These features that can be performed using a computer can use any of a variety of programming languages (e.g., a C-family programming language, PYTHON, JAVA, RUST, HASKELL, other languages, or combinations thereof), libraries (e.g., libraries that provide functions for obtaining, processing, and presenting data), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein. Such tools can include intelligent code completion tools (e.g., INTELLISENSE) and artificial intelligence tools (e.g., GITHUB COPILOT).

One or more of the elements listed above, or some combination thereof, can benefit from or be implemented using a machine learning framework. A machine learning framework is a collection of software and data that implements artificial intelligence trained to provide output based on input. Examples of artificial intelligence that can be implemented in a trainable way include neural networks (including recurrent neural networks), language models (including so-called "large language models"), generative models, natural language processing models, adversarial networks, decision trees, Markov models, support vector machines, genetic algorithms, others, or combinations thereof. Machine learning frameworks or components thereof are often built or refined from existing frameworks, such as TENSORFLOW by GOOGLE, INC. or PYTORCH by the PYTORCH community. The machine learning framework can include one or more models that are the structured representation of learning and an interface that supports use of the model.

The model can take any of a variety of forms. In many examples, the model includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model can include a representation of memory (e.g., providing long short-term memory functionality). Where the set includes more than one model, the models can be linked, cooperate, or compete to provide output.

The interface can include software procedures (e.g., defined in a library) that facilitate the use of the model, such as by providing a way to interact with the model (e.g., receive and prepare input, processing the input with the model and provide output). The interface can define a vector embedding technique for creating a representation of data usable as input into the model. The software can further provide the ability to create, customize, fine tune, and train the model.

In an example implementation, interface can provide a training method that includes initializing a model, obtaining training data, providing a portion of the training data to the model to produce an actual output, comparing the expected output with the actual output, updating the model based on the result of the comparison (e.g., updating weights of the model, such as using backpropagation), continuing providing training data and updating the model until a stopping criterion has been reached, and deploying the trained model for use in production.

Figure 8:
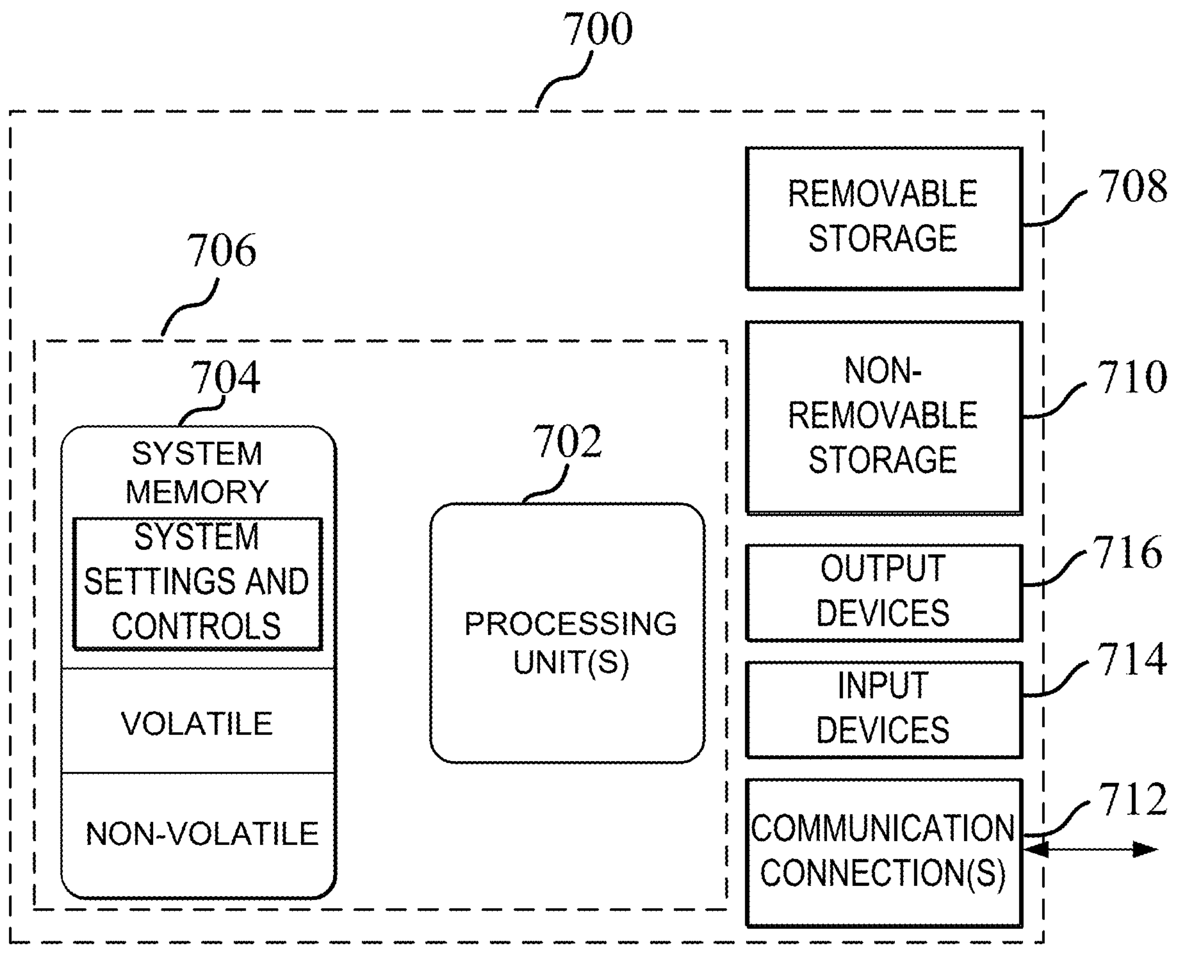
FIG. 8 depicts an example block diagram of a virtual or physical operating environment.

FIG. 8 depicts one example of a suitable operating environment 800 in which one or more of the present examples can be implemented. This is only one example of a suitable operating environment and is not intended to suggest any limitation as to the scope of use or functionality. Other well-known computing systems, environments, and/or configurations that can be suitable for use include, but are not limited to, personal computers, server computers, hand-held or laptop devices, multiprocessor systems, microprocessor-based systems, programmable consumer electronics such as smart phones, network PCs, minicomputers, mainframe computers, tablets, distributed computing environments that include any of the above systems or devices, and the like.

In its most basic configuration, operating environment 800 typically includes at least one processing unit 802 and memory 804. Depending on the exact configuration and type of computing device, memory 804 (storing, among other things, instructions to control the eject the samples, move the stage, or perform other methods disclosed herein) can be volatile (such as RAM), non-volatile (such as ROM, flash memory, etc.), or some combination of the two. This most basic configuration is illustrated in FIG. 8 by dashed line 806. Further, operating environment 800 can also include storage devices (removable, 808, and/or non-removable, 810) including, but not limited to, magnetic or optical disks or tape. Similarly, environment 800 can also have input device(s) 814 such as touch screens, keyboard, mouse, pen, voice input, etc., and/or output device(s) 816 such as a display, speakers, printer, etc. Also included in the environment can be one or more communication connections 812, such as LAN, WAN, point to point, Bluetooth, RF, etc.

Operating environment 800 typically includes at least some form of computer readable media. Computer readable media can be any available media that can be accessed by processing unit 802 or other devices having the operating environment. By way of example, and not limitation, computer readable media can include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. A computer-readable device is a hardware device incorporating computer storage media.

The operating environment 800 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some examples, the components described herein include such modules or instructions executable by operating environment 800 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some examples, operating environment 800 is part of a network that stores data in remote storage media for use by the operating environment 800.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For example, while certain technologies described herein were primarily described in the context of queueing structures, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A method for adjusting image satellite images to account for plate motion, the method comprising:

receiving a satellite image corresponding to a region at a collection time, the satellite image comprising a common point;

determining a motion of the common point between the collection time and an adjustment date to define a plate motion correction;

defining a ray from the satellite to the common point;

adjusting the ray by multiplying the plate motion correction by a difference of the adjustment date and the collection time; and applying a bundle block adjustment to generate an adjusted image for the adjustment date.

2. The method of claim 1, wherein determining the motion of the common point between the collection time and the adjustment date to define the plate motion correction comprises using a plate motion model.

3. The method of claim 1, further comprising receiving a plurality of satellite images, each of the satellite images comprising the common point at a corresponding time, and wherein the method comprises scaling the plate motion correction by a difference between the adjustment date and each of the corresponding acquisition times to compute plate motion corrections for each of the satellite images.

4. The method of claim 3, wherein the plurality of satellite images partially overlap with one another.

5. The method of claim 3, further comprising statistically fitting adjusted rays from each of the corresponding times using a statistical model.

6. The method of claim 5, wherein the statistical model is a regression algorithm.

7. The method of claim 1, wherein:

the satellite image comprises a plurality of common points including at least one tie point; and wherein the method further comprises adjusting a ray corresponding to the at least one tie point and a ray corresponding to the at least one tie point based on the difference between the adjustment date and the collection time;

and wherein applying the bundle block adjustment comprises projecting both the ray corresponding to the at least one tie point and a ground control point motion vector from ground space into image space to generate the adjusted image.

8. The method of claim 7, further comprising defining deformation zones within the satellite image and excluding the deformation zones from the adjusting of the ray by multiplication of the plate motion correction by the difference of the adjustment date and the collection time.

9. The method of claim 7, wherein the common points include features recognizable in multiple satellite images, and wherein the satellite image further comprises common points that are Ground Control Points that are features recognizable in multiple satellite images and having known ground coordinates.

10. The method of claim 7, wherein the satellite image includes a plurality of satellite images partially overlap with one another.

11. The method of claim 1, wherein the plate motion correction is applied to all points on the satellite image.

12. The method of claim 11, wherein the plate motion correction is applied as an adjustment to an attitude and ephemeris input to the satellite image.

13. A method for adjusting image satellite images to account for plate motion using a stochastic variable, the method comprising:

receiving a satellite image corresponding to a region at a collection time, the satellite image comprising a common point;

determining a motion of the common point between the collection time and an adjustment date to define a plate motion correction;

defining a ray from the satellite to the common point;

adjusting the ray by multiplying the plate motion correction by a difference of the adjustment date and the collection time according to the stochastic variable corresponding to the common point; and applying a bundle block adjustment to generate an adjusted image for a desired time amount of time.

14. The method of claim 13, wherein the method is applied to a plurality of received satellite images each corresponding to the region, each of the plurality of received satellite images taken at a corresponding time.

15. The method of claim 14, further comprising statistically fitting adjusted rays from each of the received satellite images at the corresponding times using a statistical model.

16. The method of claim 15, wherein the statistical model is a least-squares algorithm.

17. The method of claim 13, wherein the plate motion correction is applied as an adjustment to an attitude and ephemeris input to the satellite image.

18. The method of claim 13, wherein the satellite image comprises a plurality of common points, the plurality of common points including at least one ground control point and at least one tie point.

19. The method of claim 18, wherein the tie points are features recognizable in multiple satellite images, and wherein ground control points are features recognizable in multiple satellite images and having known ground coordinates.

20. The method of claim 14, wherein the plurality of satellite images partially overlap with one another.

* * * * *